US008811293B2

(12) United States Patent
Octaviano, II et al.

(10) Patent No.: US 8,811,293 B2
(45) Date of Patent: Aug. 19, 2014

(54) OPTIMIZING COMMUNICATIONS THROUGHPUT IN A WIRELESS NETWORKING ENVIRONMENT THAT SUPPORTS A PLURALITY OF COMMUNICATIONS CHANNEL TOPOLOGIES

(75) Inventors: Raymond G. Octaviano, II, Raleigh, NC (US); Daryl Cromer, Cary, NC (US); Philip J. Jakes, Durham, NC (US); Howard J. Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1333 days.

(21) Appl. No.: 11/436,800

(22) Filed: May 18, 2006

(65) Prior Publication Data

US 2007/0268854 A1    Nov. 22, 2007

(51) Int. Cl.
*H04W 4/00*    (2009.01)
(52) U.S. Cl.
USPC ........... 370/329; 370/328; 370/338; 455/450; 455/452.1; 455/452.2
(58) Field of Classification Search
CPC .................................................... H04W 72/12
USPC ......................... 370/329, 331, 332, 328, 338; 455/436–439, 441–444, 450–452.2, 455/552.1
See application file for complete search history.

(56) References Cited

U.S. PATENT DOCUMENTS

| | | | |
|---|---|---|---|
| 7,400,605 B2 * | 7/2008 | Palmer et al. | 370/333 |
| 2004/0264379 A1 | 12/2004 | Srikrishna et al. | |
| 2006/0030319 A1 * | 2/2006 | Chou et al. | 455/435.1 |
| 2006/0233134 A1 * | 10/2006 | Cromer et al. | 370/329 |

OTHER PUBLICATIONS

Wei-Cheng Liu, Li-Chun Wang, Ya-Wen Lin ; "Physical Layer Effects on the MAC Goodput Performance for the Rate Adaptive IEEE 802.11a/g WLAN"; Wireless Communications and Networking Conference; 2004; WCNC; 2004 IEEE; vol. 3, Mar. 21-25, 2004, pp. 1873-1878.

M. Malli, Qiang Ni, T. Turletti, C. Barakat; "Adaptive Fair Channel Allocation for QoS Enhancement in IEEE 802.11 Wireless LANs"; 2004; IEEE International Conference on Communications; vol. 6, Iss. 20-24; Jun. 2004; pp. 3470-3475.

D. Liu, D. Makrakis, V. Groza; "A Channel Condition Dependent QoS Enabling Scheme for IEEE802.11 Wireless LAN and its Linux Based Implementation"; IEEE CCECE 2003; Canadian Conference on Electrical and Computer Engineering, 2003; v3; 4-7; May 2003; pp. 1807-1810.

* cited by examiner

*Primary Examiner* — Marcos Torres
(74) *Attorney, Agent, or Firm* — Brandon C. Kennedy; Carlos Munoz-Bustamante; Biggers Kennedy Lenart Spraggins LLP (57) ABSTRACT

Methods, apparatus, and computer program products are disclosed for optimizing communications throughput in a wireless networking environment that supports a plurality of communications channel topologies that include identifying a plurality of clients having wireless network adapters supporting disparate channel bandwidths in the wireless networking environment, and periodically switching from one communications channel topology to another communications channel topology in dependence upon the supported channel bandwidths of the adapters of the identified clients. Optimizing communications throughput in a wireless networking environment that supports a plurality of communications channel topologies may also include identifying the supported channel bandwidths, quantifying current data traffic through each supported channel bandwidth, and switching from one communications channel topology that includes one supported channel bandwidth to another communications channel topology that includes another supported channel bandwidth at a time period dependent upon the quantified current data traffic.

18 Claims, 7 Drawing Sheets

OPTIMIZING COMMUNICATIONS THROUGHPUT IN A WIRELESS NETWORKING ENVIRONMENT THAT SUPPORTS A PLURALITY OF COMMUNICATIONS CHANNEL TOPOLOGIES

BACKGROUND OF THE INVENTION

1. Field of the Invention

The field of the invention is data processing, or, more specifically, methods, apparatus, and products for optimizing communications throughput in a wireless networking environment that supports a plurality of communications channel topologies.

2. Description of Related Art

Increases in use of laptop computers within business enterprises and increases in worker mobility have fueled the demand for wireless networks. In the past, wireless technology was a patchwork of incompatible systems from a variety of vendors. The technology was slow, expensive, and reserved for mobile situations or hostile environments where cabling was impractical or impossible. With the emergence of new industry standards and the deployment of lightweight wireless networking hardware across a broad market section, wireless technology has come of age.

As new industry standards emerge in wireless technology, the wireless technology industry must embrace new capabilities, higher bandwidths, and new challenges. The wireless technology industry is rapidly adopting these new standards and incorporating the standards into new products. For example, the standard configuration of many wireless network laptop adapters implemented the Institute of Electrical and Electronics Engineers ('IEEE') 802.11b standard in 2003, the IEEE 802.11b and 802.11g standards in 2004, the IEEE 802.11a, 802.11b, and 802.11g standards in 2005, and soon many wireless network laptop adapters will implement the new IEEE 802.11n standard when the standard is finalized in 2007. The group of the IEEE responsible for promulgating the 802.11n standard may choose the TGn Sync proposal supported by Intel and Philips. Because the wireless technologies are backwardly compatible, implementation of the new standards by computer system manufacturers usually occurs in a somewhat straight forward manner. That is, backwardly compatible in that wireless network laptop adapters implementing the industry standards fall back from implementing the IEEE 802.11n standard, to the IEEE 802.11a standard, to the IEEE 802.11g standard, and then to the IEEE 802.11b standard depending on conditions of a particular wireless networking environment.

Wireless network adapters supporting the IEEE 802.11b, 802.11g, and 802.11n standards operate in the 2.4 gigahertz (GHz) radio frequency spectrum. The number of channels available for data communications in the 2.4 GHz radio frequency spectrum depends on the mixture of the wireless network adapter population. When the population consists of wireless network adapters implementing the IEEE 802.11b and 802.11g standards, three non-overlapping channels are available for data communications. All three channels have a channel bandwidth of 20 megahertz ('MHz') as specified in the IEEE 802.11b and 802.11g standards. When the population consists of wireless network adapters implementing the IEEE 802.11b and 802.11g standards and the 40 MHz channel option of the TGn Sync proposal for the IEEE 802.11n standard, two channels are available for data communications. One channel has a bandwidth of 20 MHz for use by wireless network adapters implementing the IEEE 802.11b and 802.11g standards, and one channel has a bandwidth of 40 MHz for use by wireless network adapters implementing the TGn Sync proposal for the IEEE 802.11n standard.

Dividing the 2.4 GHz radio frequency spectrum into three 20 MHz channels does not allow wireless network adapters supporting a 40 MHz channel bandwidth to utilize the highest data transfer rates specified in the TGn Sync proposal for the IEEE 802.11n standard. In a communications channel topology that includes three 20 MHz channels, wireless network adapters supporting a 40 MHz channel bandwidth are forced to operate in their backward compatible modes that utilize a 20 MHz channel bandwidth. Dividing the 2.4 GHz radio frequency spectrum into one 20 MHz channel and one 40 MHz channel, however, forces all the wireless network adapters that only support a 20 MHz channel bandwidth to transfer data through one 20 MHz channel. Because an overwhelming majority of current wireless network adapters only support a 20 MHz channel bandwidth, data transfer rates in a communications channel topology that includes one 20 MHz channel and one 40 MHz channel would suffer greatly. Regardless of whether a wireless network architect chooses a channel topology that includes three 20 MHz channels or a channel topology that includes one 20 MHz channel and one 40 MHz channel, the data transfer rates in a wireless networking environment suffer.

SUMMARY OF THE INVENTION

Methods, apparatus, and computer program products are disclosed for optimizing communications throughput in a wireless networking environment that supports a plurality of communications channel topologies that include identifying a plurality of clients having wireless network adapters supporting disparate channel bandwidths in the wireless networking environment, and periodically switching from one communications channel topology to another communications channel topology in dependence upon the supported channel bandwidths of the adapters of the identified clients. Optimizing communications throughput in a wireless networking environment that supports a plurality of communications channel topologies may also include identifying the supported channel bandwidths, quantifying current data traffic through each supported channel bandwidth, and switching from one communications channel topology that includes one supported channel bandwidth to another communications channel topology that includes another supported channel bandwidth at a time period dependent upon the quantified current data traffic.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
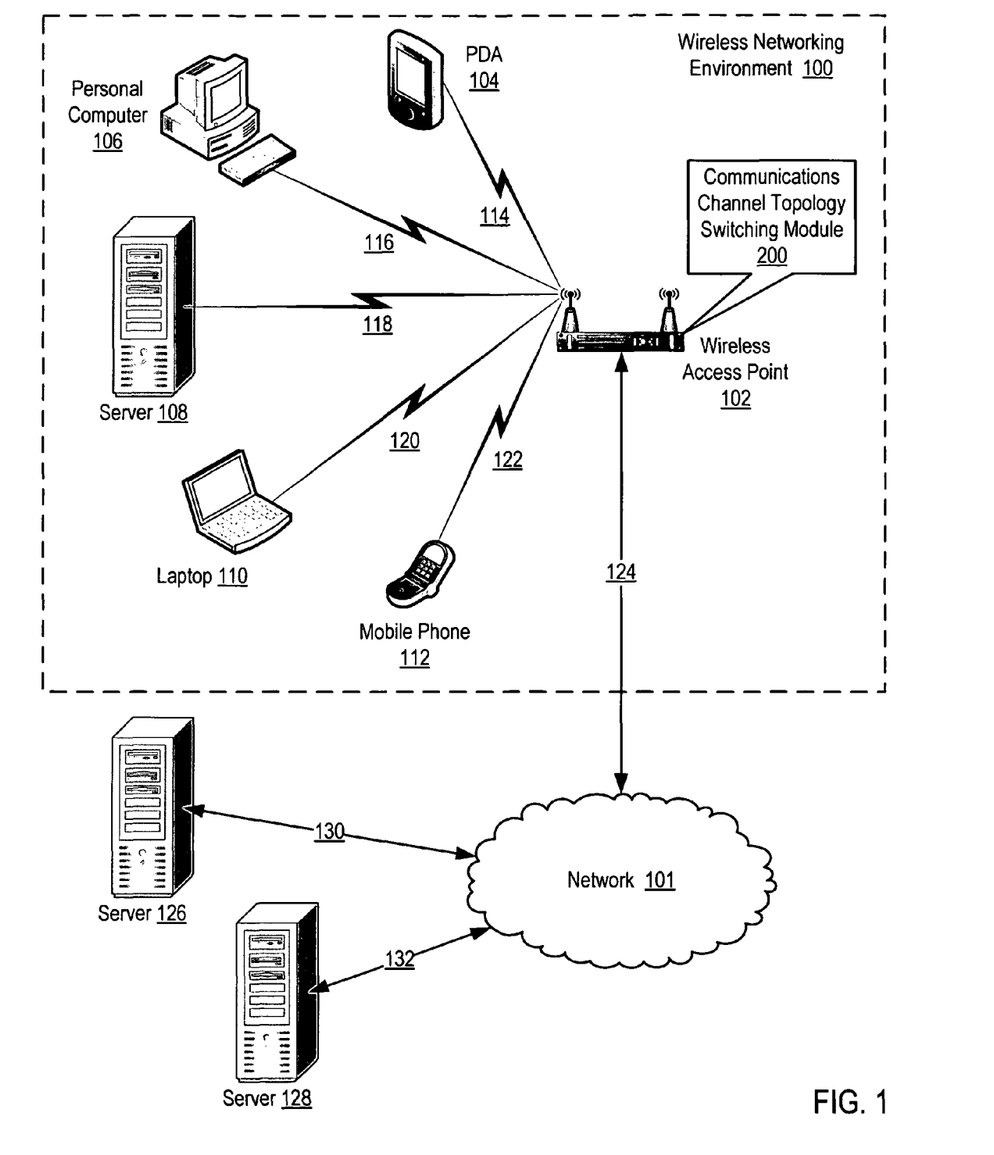
FIG. 1 sets forth a network diagram illustrating an exemplary system for optimizing communications throughput in a wireless networking environment that supports a plurality of communications channel topologies according to embodiments of the present invention.

Exemplary methods, apparatus, and products for optimizing communications throughput in a wireless networking environment that supports a plurality of communications channel topologies according to embodiments of the present invention are described with reference to the accompanying drawings, beginning with FIG. 1. FIG. 1 sets forth a network diagram illustrating an exemplary system for optimizing communications throughput in a wireless networking environment that supports a plurality of communications channel topologies according to embodiments of the present invention. The system of FIG. 1 operates generally to optimize communications throughput in a wireless networking environment that supports a plurality of communications channel topologies according to embodiments of the present invention by identifying a plurality of clients having wireless network adapters supporting disparate channel bandwidths in the wireless networking environment, and periodically switching from one communications channel topology to another communications channel topology in dependence upon the supported channel bandwidths of the adapters of the identified clients.

The exemplary system of FIG. 1 includes a wireless networking environment (100). A wireless networking environment is a computing environment implementing wireless data communications between computing devices. Wireless networking environments often implement data communications according to one or more wireless networking standards that provide a common communications architecture for a variety of wireless devices. Examples of wireless networking standards may include the IEEE 802.11a standard, the IEEE 802.11b standard, the IEEE 802.11g standard, the TGn Sync proposal for the IEEE 802.11n standard, and others as will occur to those of skill in the art.

A communications channel topology is the arrangement of one or more communication channels throughout the electromagnetic frequency spectrum for data communication in a wireless networking environment. Each wireless networking standard typically specifies characteristics for a communications channel used for data communications in a wireless networking environment. Characteristics of a communications channel may include, for example, channel bandwidth, the central frequency of the channel, the channel identifier, and so on. For example, the IEEE 802.11b and 802.11g standards that divide the 2.4 gigahertz ('GHz') radio frequency spectrum into fourteen overlapping, staggered channels whose center frequencies are 5 megahertz ('MHz') apart. In contrast, the IEEE 802.11a standard divides the 5.0 GHz radio frequency spectrum into 12 non-overlapping channels.

Channel bandwidth is the frequency range occupied by a modulated carrier wave centered on the central frequency of a communications channel. The frequency range is typically specified in terms of a central frequency and a spectral mask for the channel. The spectral mask for the IEEE 802.11b standard specifies that the modulated carrier wave be attenuated by at least 30 decibels ('dB') from the modulated carrier wave's peak energy at ±11 MHz from the central frequency, and be attenuated by at least 50 dB from the modulated carrier wave's peak energy at ±22 MHz from the central frequency. Because attenuation by at least 30 dB from the modulated carrier wave's peak energy at ±11 MHz from the central frequency reduces the likelihood for signal interference in many wireless networking environments, the channel bandwidth for communications channels specified in the IEEE 802.11b standard is often referred to generally as 22 MHz or 20 MHz. Different wireless network standards, however, may specify communications channels with disparate channel bandwidths. For example, the channel bandwidth for the communications channels specified in TGn Sync proposal for the IEEE 802.11n standard is referred to generally as 40 MHz. Communications channels having larger channel bandwidths, such as the channels specified in TGn Sync proposal, typically result in greater communications throughput than other channels having smaller channel bandwidths. Communications throughput is the overall rate of data transferred through one or more communications channels with respect to time. Communications throughput is typically measured in megabits per second ('Mbps').

In the exemplary system of FIG. 1, the wireless networking environment (100) includes a wireless access point (102). A wireless access point is a device that connects wireless communication clients together to form a wireless networking environment. In the exemplary system of FIG. 1, the wireless access point (102) connects to network (101) through a wireline connection (124). Wireless access point (102) operates to relay data among wireless communication clients (104, 106, 108, 110, 112) and servers (126, 128) connected to network (101). In the example of FIG. 1, the server (126) connects to the network (101) through wireline connection (130). The server (128) connects to the network (101) through a wireline connection (132).

In the exemplary system of FIG. 1, the wireless access point (102) has installed upon it a communications channel topology switching module (200). The communications channel topology switching module (200) is a set of computer program instructions improved for optimizing communications throughput in a wireless networking environment that supports a plurality of communications channel topologies according to embodiments of the present invention. The communications channel topology switching module (200) operates generally for optimizing communications throughput in a wireless networking environment that supports a plurality of communications channel topologies according to embodiments of the present invention by identifying a plurality of clients having wireless network adapters supporting disparate channel bandwidths in the wireless networking environment, and periodically switching from one communications channel topology to another communications channel topology in dependence upon the supported channel bandwidths of the adapters of the identified clients.

The exemplary system of FIG. 1 includes several wireless communication clients (104, 106, 108, 110, 112) having wireless network adapters for implementing data communications with the wireless access point (102). A client is any device into which a wireless network adapter is installed for operation. A wireless network adapter implements the hardware level of the Internet protocol suite for data communications through which one clients sends data communications to a wireless access point or other wireless communications device. Examples of wireless network adapters useful for optimizing communications throughput in a wireless networking environment that supports a plurality of communications channel topologies according to embodiments of the present invention may include IEEE 802.11b adapters, IEEE 802.11g adapters, IEEE 802.11n adapters, and so on. In the example of FIG. 1, the personal digital assistant ('PDA') (104) connects to the wireless access point (102) through wireless connection (114). The personal computer (106) connects to the wireless access point (102) through wireless connection (116). The server (108) connects to the wireless access point (102) through wireless connection (118). The laptop (110) connects to the wireless access point (102) through wireless connection (120). The network-enabled mobile phone (112) connects to the wireless access point (102) through wireless connection (122).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Optimizing communications throughput in a wireless networking environment that supports a plurality of communications channel topologies in accordance with the present invention is generally implemented with computers, that is, with automated computing machinery. In the system of FIG. 1, for example, the wireless access point (102) is implemented to some extent at least as a computer. For further explanation, therefore, FIG. 2 sets forth a block diagram of automated computing machinery comprising an exemplary wireless access point (102) useful in optimizing communications throughput in a wireless networking environment that supports a plurality of communications channel topologies according to embodiments of the present invention. Wireless access point (102) of FIG. 2 includes at least one computer processor (156) or 'CPU' as well as random access memory (168) ('RAM') which is connected through a system bus (160) to processor (156) and to other components of the wireless access point.

Figure 2:
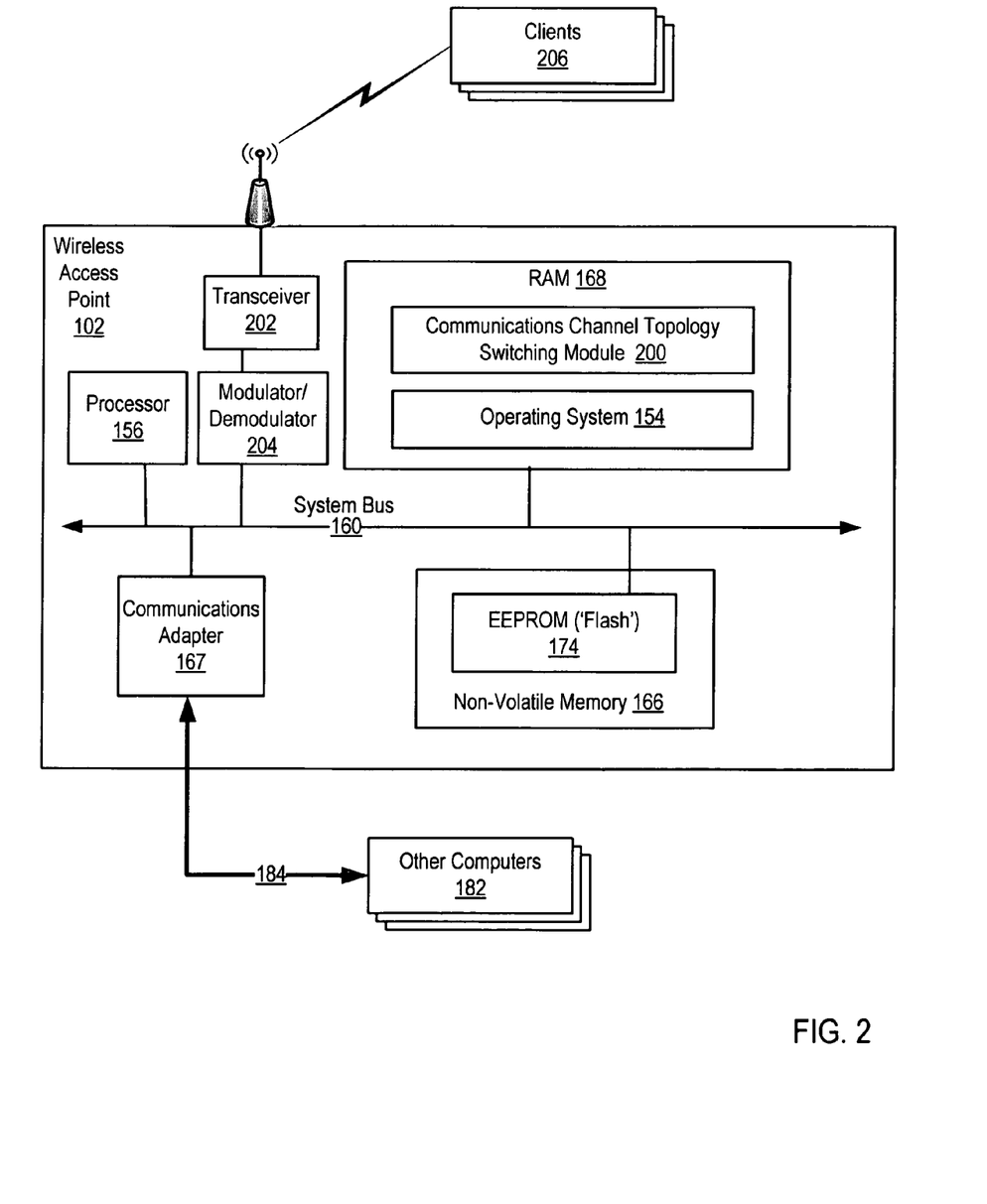
FIG. 2 sets forth a block diagram of automated computing machinery comprising an exemplary wireless access point useful in optimizing communications throughput in a wireless networking environment that supports a plurality of communications channel topologies according to embodiments of the present invention.

Stored in RAM (168) is a communications channel topology switching module (200), a set of computer program instructions improved for optimizing communications throughput in a wireless networking environment that supports a plurality of communications channel topologies according to embodiments of the present invention. The communications channel topology switching module (200) operates generally for optimizing communications throughput in a wireless networking environment that supports a plurality of communications channel topologies according to embodiments of the present invention by identifying a plurality of clients having wireless network adapters supporting disparate channel bandwidths in the wireless networking environment, and periodically switching from one communications channel topology to another communications channel topology in dependence upon the supported channel bandwidths of the adapters of the identified clients.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and the communications channel topology switching module (200) in the example of FIG. 2 are shown in RAM (168), but many components of such software typically are stored in non-volatile memory (166) also.

The exemplary wireless access point (102) of FIG. 2 includes non-volatile computer memory (166) coupled through a system bus (160) to processor (156) and to other components of wireless access point (102). Non-volatile computer memory (166) may be implemented as electrically erasable programmable read-only memory space (so-called 'EEPROM' or 'Flash' memory) (174), RAM drives (not shown), or as any other kind of computer memory as will occur to those of skill in the art.

The exemplary wireless access point (102) of FIG. 2 also includes a modulator/demodulator (204) coupled through a system bus (160) to processor (156) and to other components of wireless access point (102). The modulator/demodulator (204) is a device that utilizes a carrier signal to encode and decode data processed by wireless access point (102). A modulator/demodulator implements the hardware level of data communications through which a wireless access point transmits and receives data in a wireless networking environment.

The exemplary wireless access point (102) of FIG. 2 includes a transceiver (202) connected to the modulator/demodulator (204). The transceiver (202) is device having the electronic circuitry for both transmitting and receiving modulated carrier signal through a transmission medium to clients (206). A transceiver implements the hardware level of data communications through which a wireless access point transmits and receives data in a wireless networking environment.

The exemplary wireless access point (102) of FIG. 2 also includes a communications adapter (167) for implementing data communications (184) with other computers (182). Such data communications may be carried out serially through RS-232 connections, through external buses such as the Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful for optimizing communications throughput in a wireless networking environment that supports a plurality of communications channel topologies according to embodiments of the present invention include modems for wired dial-up communications, Ethernet (IEEE 802.3) adapters for wired network communications, and IEEE 802.11b adapters for wireless network communications.

Figure 3:
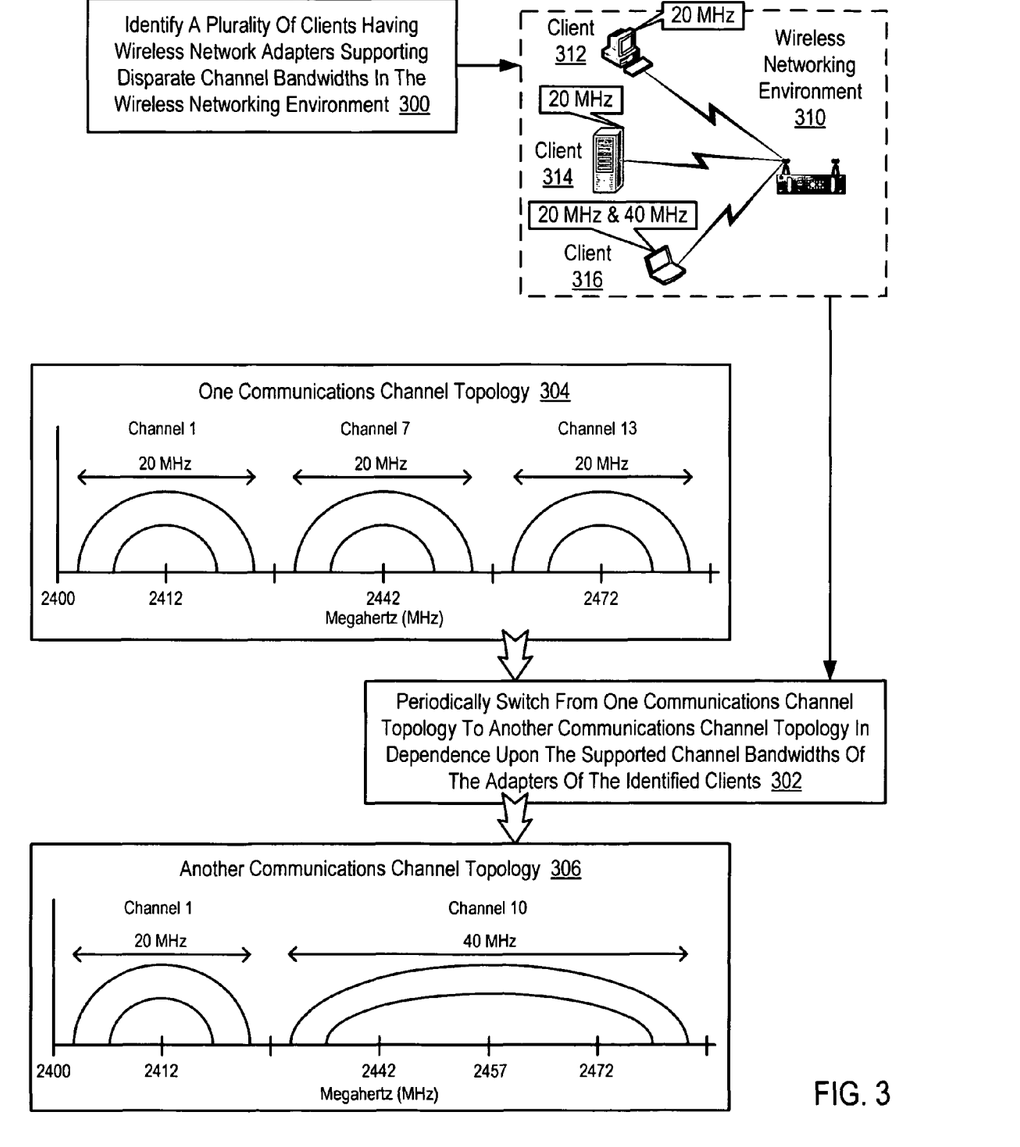
FIG. 3 sets forth a flow chart illustrating an exemplary method for optimizing communications throughput in a wireless networking environment that supports a plurality of communications channel topologies according to embodiments of the present invention.

For further explanation, FIG. 3 sets forth a flow chart illustrating an exemplary method for optimizing communications throughput in a wireless networking environment that supports a plurality of communications channel topologies according to embodiments of the present invention. The method of FIG. 3 includes identifying (300) a plurality of clients (312, 314, 316) having wireless network adapters supporting disparate channel bandwidths in the wireless networking environment (310). In the example of FIG. 3, the wireless network adapters of clients (312, 314) support a channel bandwidth of 20 MHz, while the wireless network adapter of client (316) supports channel bandwidths of 20 MHz and 40 MHz. Identifying (300) a plurality of clients (312, 314, 316) having wireless network adapters supporting disparate channel bandwidths in the wireless networking environment (310) may be carried out as discussed below with reference to FIG. 4.

The method of FIG. 3 also includes periodically switching (302) from one communications channel topology (304) to another communications channel topology (306) in dependence upon the supported channel bandwidths of the adapters of the identified clients. One communications channel topology (304) of FIG. 3 includes three channels identified as 'Channel 1,' 'Channel 7,' and 'Channel 13,' and centered on frequencies of 2412 MHz, 2442 MHz, and 2472 MHz respectively. Each communications channel in one communications channel topology (304) has a channel bandwidth of approximately 20 MHz. Another communications channel topology (306) of FIG. 3 includes two channels identified as 'Channel 1' and 'Channel 10,' and centered on frequencies of 2412 MHz and 2457 MHz respectively. Channel 1 has a channel bandwidth of approximately 20 MHz, while Channel 10 has a channel bandwidth of approximately 40 MHz. Because Channel 10 has a larger channel bandwidth, Channel 10 occupies more of the radio frequency spectrum than Channels 1, 7, or 13. Less channels, therefore are available for data communications in a wireless networking environment implemented using the another communications channel topology (306). Readers will note that the example communications channel topologies depicted in the example of FIG. 3 are for explanation and not for limitation. Other communications channel topologies as will occur to those of skill in the art may be useful in optimizing communications throughput in a wireless networking environment that supports a plurality of communications channel topologies according to embodiments of the present invention.

As mentioned above, channels having larger channel bandwidths typically allow for greater communications throughput than channels having smaller channel bandwidths. In the example of FIG. 3, therefore, client (316) will transfer data more efficiently, that is with a higher communication throughput, in a wireless networking environment implemented using the communications channel topology (306) than in a wireless networking environment implemented using the communications channel topology (304). In the communications channel topology (306), however, clients (312, 314) only have one channel through which to transfer data, whereas in the communications channel topology (304) clients (312, 314) have three channels through which to transfer data.

Figure 4:
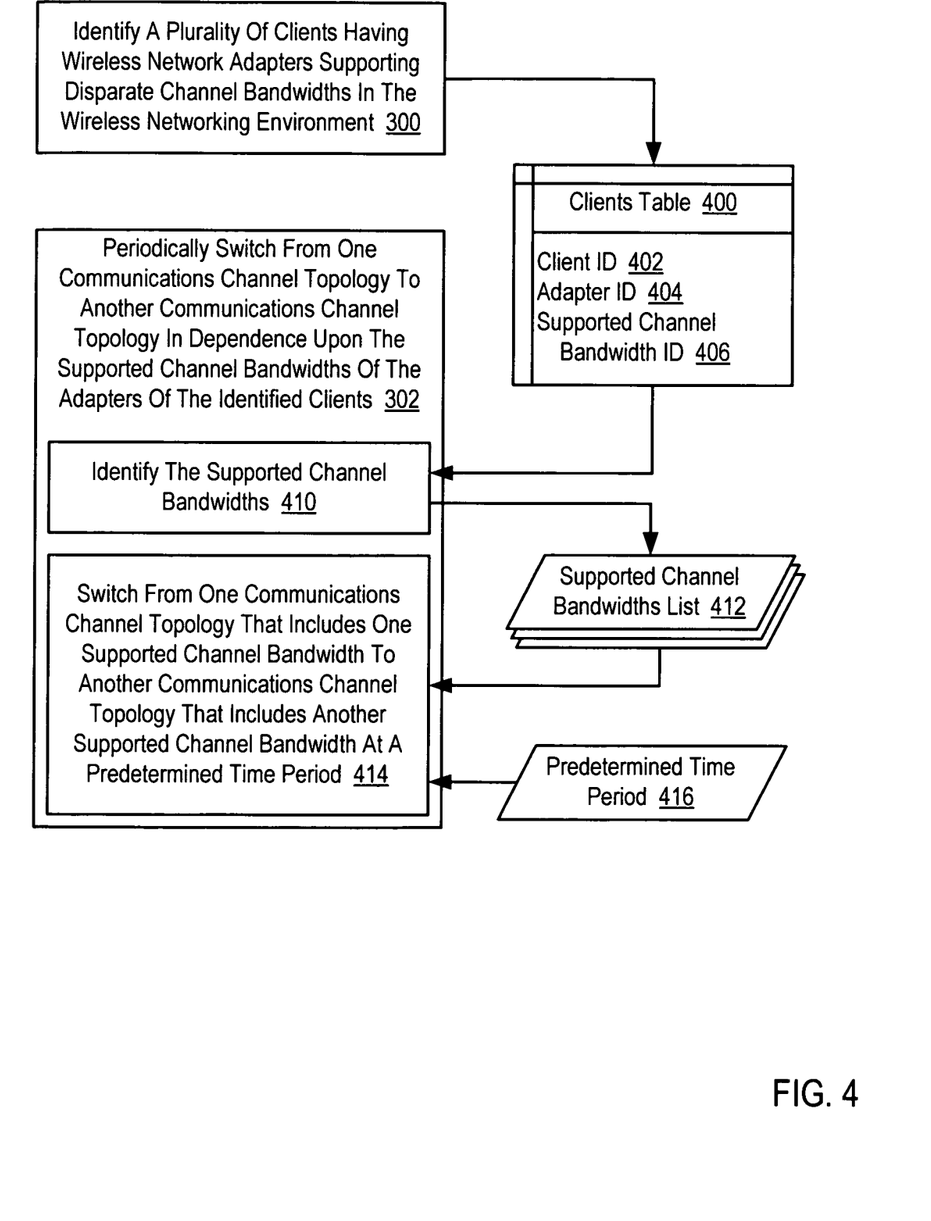
FIG. 4 sets forth a flow chart illustrating a further exemplary method for optimizing communications throughput in a wireless networking environment that supports a plurality of communications channel topologies according to embodiments of the present invention.

In the method of FIG. 3, periodically switching (302) from one communications channel topology (304) to another communications channel topology (306) in dependence upon the supported channel bandwidths of the adapters of the identified clients may be carried out by identifying the supported channel bandwidths and switching from one communications channel topology (304) that includes one supported channel bandwidth to another communications channel topology (306) that includes another supported channel bandwidth at a predetermined time period as discussed below with reference to FIG. 4. Switching from one communications channel topology (304) that includes one supported channel bandwidth to another communications channel topology (306) that includes another supported channel bandwidth at a predetermined time period advantageously allows for optimizing communications throughput in a wireless networking environment without limiting the communications throughput with a communications channel topology having only small channel bandwidths.

Figure 5:
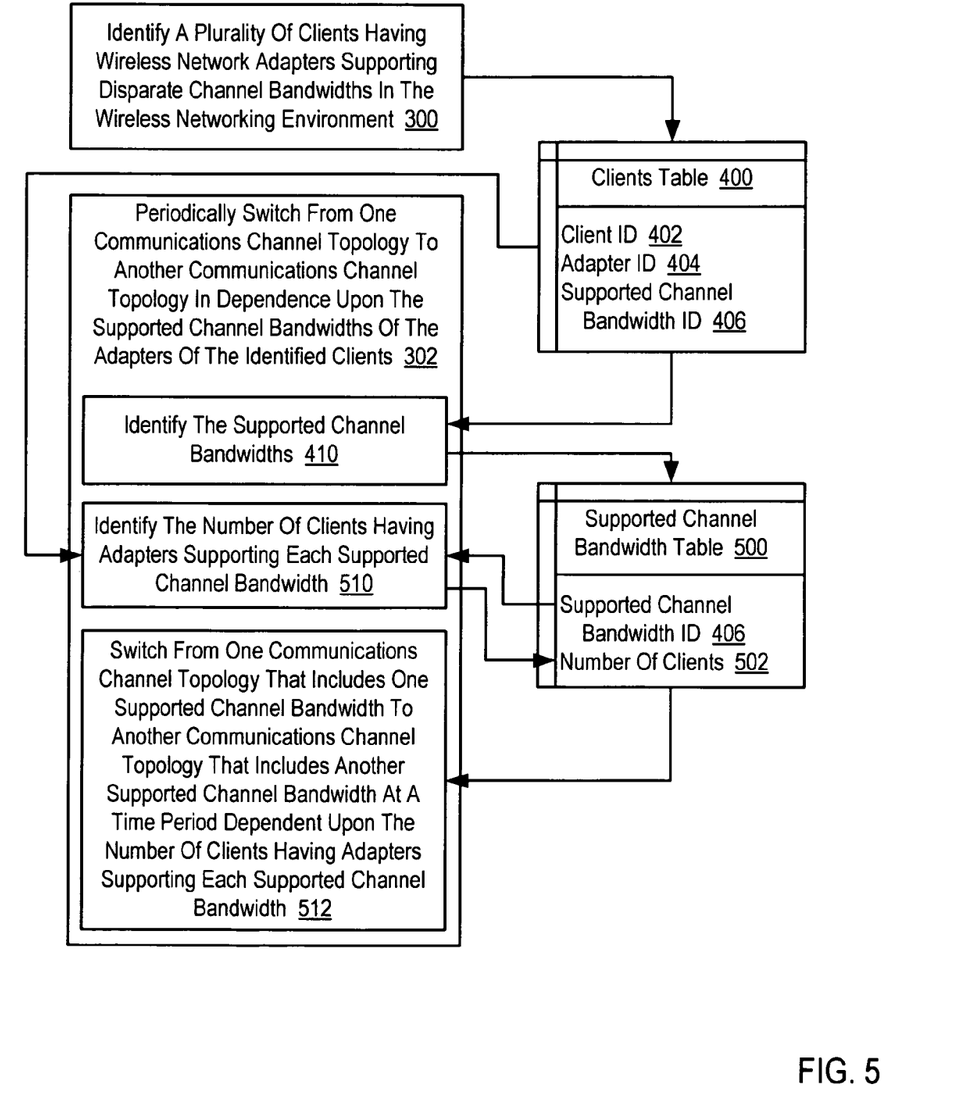
FIG. 5 sets forth a flow chart illustrating a further exemplary method for optimizing communications throughput in a wireless networking environment that supports a plurality of communications channel topologies according to embodiments of the present invention.
Figure 7:
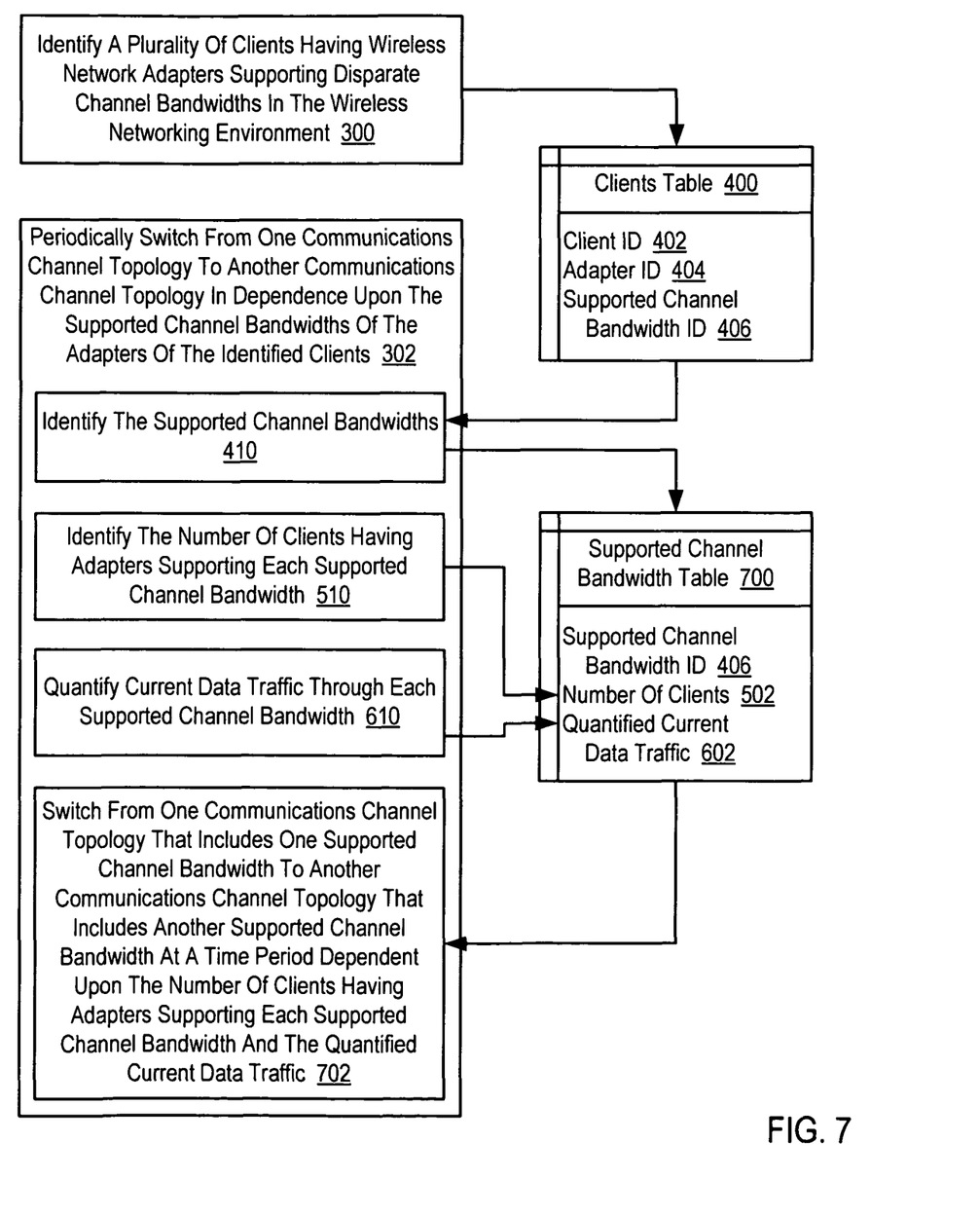
FIG. 7 sets forth a flow chart illustrating a further exemplary method for optimizing communications throughput in a wireless networking environment that supports a plurality of communications channel topologies according to embodiments of the present invention.

In the method of FIG. 3, periodically switching (302) from one communications channel topology (304) to another communications channel topology (306) in dependence upon the supported channel bandwidths of the adapters of the identified clients may also be carried out by identifying the number of clients having adapters supporting each supported channel bandwidth and switching from one communications channel topology (304) that includes one supported channel bandwidth to another communications channel topology (306) that includes another supported channel bandwidth at a time period dependent upon the number of clients having adapters supporting each supported channel bandwidth as discussed below with reference to FIGS. 5 and 7. Switching from one communications channel topology (304) that includes one supported channel bandwidth to another communications channel topology (306) that includes another supported channel bandwidth at a time period dependent upon the number of clients having adapters supporting each supported channel bandwidth advantageously allows for optimizing communications throughput in a wireless networking environment where a large disparity exists in the number of clients having adapters supporting each channel bandwidth.

Figure 6:
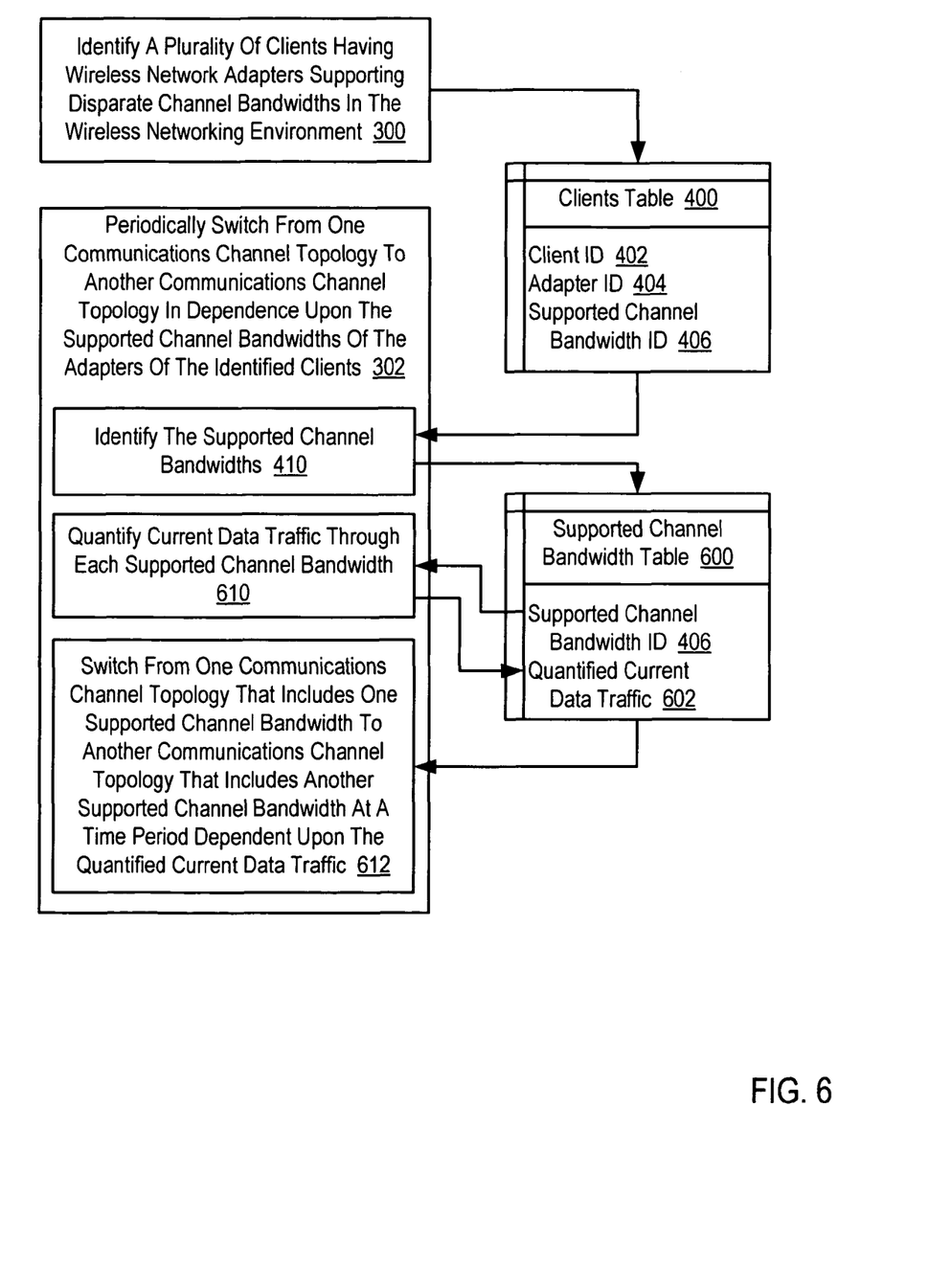
FIG. 6 sets forth a flow chart illustrating a further exemplary method for optimizing communications throughput in a wireless networking environment that supports a plurality of communications channel topologies according to embodiments of the present invention.

In the method of FIG. 3, periodically switching (302) from one communications channel topology (304) to another communications channel topology (306) in dependence upon the supported channel bandwidths of the adapters of the identified clients may also be carried out by quantifying data traffic through each supported channel bandwidth and switching from one communications channel topology (304) that includes one supported channel bandwidth to another communications channel topology (306) that includes another supported channel bandwidth at a time period dependent upon the quantified data traffic as discussed below with reference to FIGS. 6 and 7. Switching from one communications channel topology (304) that includes one supported channel bandwidth to another communications channel topology (306) that includes another supported channel bandwidth at a time period dependent upon the quantified data traffic advantageously allows for optimizing communications throughput in a wireless networking environment where a large disparity exists in the quantity of data traffic through each supported channel bandwidth.

As mentioned above, periodically switching from one communications channel topology to another communications channel topology in dependence upon the supported channel bandwidths of the adapters of the identified clients may be carried out by switching from one communications channel topology that includes one supported channel bandwidth to another communications channel topology that includes another supported channel bandwidth at a predetermined time period. For further explanation, therefore, FIG. 4 sets forth a flow chart illustrating a further exemplary method for optimizing communications throughput in a wireless networking environment that supports a plurality of communications channel topologies according to embodiments of the present invention that includes switching (414) from one communications channel topology that includes one supported channel bandwidth to another communications channel topology that includes another supported channel bandwidth at a predetermined time period.

The method of FIG. 4 also includes identifying (300) a plurality of clients having wireless network adapters supporting disparate channel bandwidths in the wireless networking environment. Identifying (300) a plurality of clients having wireless network adapters supporting disparate channel bandwidths in the wireless networking environment may be carried out using the authentication, association, and synchronization processes described in the IEEE 802.11 series of wireless networking standards to establish a data communications connection and exchange capabilities information with each client. Identifying (300) a plurality of clients having wireless network adapters supporting disparate channel bandwidths in the wireless networking environment may further be carried out by storing identifiers for each client, the adapter of each client, and the supported channel bandwidth of the adapter of each client in a clients table (400).

The example of FIG. 4 includes a clients table (400) that associates a client identifier (402) with a wireless network adapter identifier (404) and a supported channel bandwidth identifier (406). The client identifier (402) represents a client in a wireless network environment. The wireless network adapter identifier (404) represents the adapter installed in the client represented by the associated client identifier (402). The supported channel bandwidth identifier (406) represents the channel bandwidths supported by the adapter represented by the associated adapter identifier (404).

The method of FIG. 4 also includes periodically switching (302) from one communications channel topology to another communications channel topology in dependence upon the supported channel bandwidths of the adapters of the identified clients. Periodically switching (302) from one communications channel topology to another communications channel topology in dependence upon the supported channel bandwidths of the adapters of the identified clients according to the method of FIG. 4 includes identifying (410) the supported channel bandwidths. Identifying (410) the supported channel bandwidths may be carried out by traversing through the clients table (400) for unique supported channel bandwidth identifier (406). Identifying (410) the supported channel bandwidths may further be carried out by storing each unique supported channel bandwidth identifier (406) in a supported channel bandwidths list (412). The supported channel bandwidths list (412) identifies all the disparate channel bandwidths supported by adapters of clients in a wireless networking environment.

In the method of FIG. 4, periodically switching (302) from one communications channel topology to another communications channel topology in dependence upon the supported channel bandwidths of the adapters of the identified clients includes switching (414) from one communications channel topology that includes one supported channel bandwidth to another communications channel topology that includes another supported channel bandwidth at a predetermined time period. In the example of FIG. 4, predetermined time period (416) represents a time period in which a particular communications channel topology is the active communications channel topology implementing data communication. That is, the predetermined time period (416) represents the time period in which a particular distribution of channels throughout the radio frequency spectrum and particular channel characteristics are used for data communication in a wireless networking environment. Because the overall communications throughput varies from one communications channel topology to another, the predetermined time period (416) may be different for each communications channel topology implementing data communications in a wireless networking environment. For example, the predetermined time period (416) for communication channel topologies with greater communications throughput than other topologies may be shorter than the predetermined time period (416) for other topologies.

In the method of FIG. 4, switching (414) from one communications channel topology that includes one supported channel bandwidth to another communications channel topology that includes another supported channel bandwidth at a predetermined time period may be carried out by placing wireless network adapters in an asleep state that are utilizing channels in one topology having one supported channel bandwidth represented in the supported channel bandwidths list (412) after the time period specified by the value of the predetermined time period (416). Switching (414) from one communications channel topology that includes one supported channel bandwidth to another communications channel topology that includes another supported channel bandwidth at a predetermined time period may further be carried out by placing wireless network adapters in an awake state that are utilizing channels in another topology having another supported channel bandwidth represented in the supported channel bandwidths list (412) after the time period specified by the value of the predetermined time period (416). Placing wireless network adapters in an asleep state or an awake state may be carried out as described in the IEEE 802.11 series of wireless network standards.

Optimizing communications throughput in a wireless networking environment according to the method of FIG. 4 advantageously increases communications throughput in a wireless networking environment that supports a plurality of communications channel topologies. Consider the example below that compares the communications throughput in a wireless networking environment that switches from one communications channel topology to another communications channel topology according to the method of FIG. 4 with the communications throughput in a wireless networking environment that implements the communications channel topologies separately. The example explained below is described in terms of the two topologies depicted in the example of FIG. 3. One communications channel topology includes three channels conforming to the IEEE 802.11b standard having a 20 MHz channel bandwidth. Another communications channel topology includes one channel conforming to the IEEE 802.11b standard having a 20 MHz channel bandwidth and one channel conforming to the TGn Sync proposal for the IEEE 802.11n standard having a 40 MHz channel bandwidth. For purposes of this example, consider that the 20 MHz channels have a maximum communications throughput of 6 Mbps, and the 40 MHz channel has a maximum communications throughput of 100 Mbps. Consider further that the wireless networking environment includes three clients having wireless network adapters that support a channel bandwidth of 20 MHz and includes one client having wireless network adapters that supports a channel bandwidth of either 20 MHz or 40 MHz. Each client has 100 megabits (Mb) of data to transfer through a communications channel.

To calculate the communications throughput for the one communications channel topology having three 20 MHz channels, the overall time period for all four clients to transmit their 100 Mb of data through the three 20 MHz channels must be calculated. The overall time period for all four clients to transmit their 100 Mb of data may be calculated as follows:

$$T_{T1} = C_{20} * D \div R_{20} \div B_{20} = 4 \text{ clients} * 100 \text{ Mb} \div 6 \text{ Mbps} \div 3 \text{ channels} = 22.22 \text{ seconds}$$

where $T_{T1}$ is time period required to transmit data in a communications channel topology having three 20 MHz channels, $C_{20}$ is the number of clients having an adapter operating with a 20 MHz channel bandwidth, D is the quantity of data that each client has to transfer, $R_{20}$ is the maximum communications throughput of a 20 MHz channel, and $B_{20}$ is the number of 20 MHz channels in the topology. After calculating the overall time period for all four clients to transmit their 100 Mb of data through the three 20 MHz channels, the total communications throughput for the topology having three 20 MHz channels may be calculated as follows:

$$R_{T1} = C_{20} * D \div T_{T1} = 4 \text{ clients} * 100 \text{ Mb} \div 22.22 \text{ seconds} = 18.00 \text{ Mbps}$$

where $R_{T1}$ is the total communications throughput for the topology having three 20 MHz channels, $C_{20}$ is the number of clients having an adapter operating with a 20 MHz channel bandwidth, D is the quantity of data that each client has to transfer, and $T_{T1}$ is time period required to transmit data in a communications channel topology having three 20 MHz channel.

In a manner similar to the communications channel topology above, the overall time period for all four clients to transmit their 100 Mb of data through the two channels must be calculated in order to calculate the communications throughput for another exemplary communications channel topology having one 20 MHz channel and one 40 MHz channel. In the exemplary topology having one 20 MHz channel and one 40 MHz channel, three of the clients will have to transmit data through the one 20 MHz, while one client may transmit data through the 40 MHz channel. Because the 20 MHz channel acts as a bottleneck for transferring data in this example, the overall time period for all four clients to transmit their 100 Mb of data through the two channels depends on the time period for transferring the data of the three clients using the 20 MHz channel. The overall time period for the three clients to transmit their 100 Mb of data may be calculated as follows:

$$T_{T2} = C_{20} * D \div R_{20} \div B_{20} = 3 \text{ clients} * 100 \text{ Mb} \div 6 \text{ Mbps} \div 1 \text{ channel} = 50.00 \text{ seconds}$$

where $T_{T2}$ is time period required to transmit data in a communications channel topology having one 20 MHz channel and one 40 MHz channel, $C_{20}$ is the number of clients having an adapter operating with a 20 MHz channel bandwidth, D is the quantity of data that each client has to transfer, $R_{20}$ is the maximum communications throughput of a 20 MHz channel, and $B_{20}$ is the number of 20 MHz channels in the topology. After calculating the overall time period for the three clients to transfer their 100 Mb of data through the one 20 MHz channel, the total communications throughput for the topology having one 20 MHz channel and one 40 MHz channel may be calculated as follows:

$$R_{T2} = C * D \div T_{T2} = 4 \text{ clients} * 100 \text{ Mb} \div 50.00 \text{ seconds} = 8.00 \text{ Mbps}$$

where $R_{T2}$ is the total communications throughput for the topology having one 20 MHz channel and one 40 MHz channel, C is the number of clients transferring data, D is the quantity of data that each client has to transfer, and $T_{T2}$ is time period required to transmit data in a communications channel topology having one 20 MHz channel and one 40 MHz channel.

After calculating the communications throughput for each exemplary topology above, the communications throughput achieved by switching from one communications channel topology to another communications channel topology according to the method of FIG. 4 may be calculated for comparison. Continuing with the example from above, consider that the predetermined time period for switching to the topology having three 20 MHz channels is 17 times longer than the predetermined time period for switching to the topology having one 20 MHz channel and one 40 MHz channel. The overall time period for all four clients to transmit their 100 Mb of data may be calculated as follows:

$$T_{T1/T2} = (T_{20} + T_{40}) * C * D \div ((R_{20} + R_{40}) * T_{20} + (R_{20} * B_{20}) * T_{40}) = (1 \text{ second} + 17 \text{ seconds}) * 4 \text{ clients} * 100 \text{ Mb} \div ((100 \text{ Mps} + 6 \text{ Mbps}) * 1 \text{ second} + (6 \text{ Mbps} * 3 \text{ channels}) * 17 \text{ seconds}) = 17.48 \text{ seconds}$$

where $T_{T1/T2}$ is the time period required to transmit data in a wireless networking environment switching from one communications channel topology to another communications channel topology according to the method of FIG. 4, $T_{20}$ is the time period required by three of the clients to transfer data using the topology having three 20 MHz channels, $T_{40}$ is the time period required by two of the clients to transfer data using the topology having one 20 MHz channel and one 40 MHz channel, C is the number of clients transferring data, D is the quantity of data that each client has to transfer, $R_{20}$ is the maximum communications throughput of a 20 MHz channel, and R40 is the maximum communications throughput of a 40 MHz channel.

After calculating the time period required to transmit data in a wireless networking environment switching from one communications channel topology to another communications channel topology according to the method of FIG. 4, the communications throughput for a wireless network implementing the method of FIG. 4 may be calculated as:

$$R_{T1/T2} = C * D \div T_{T1/T2} = 4 \text{ clients} * 100 \text{ Mb} \div 17.48 \text{ seconds} = 22.88 \text{ Mbps}$$

where $R_{T1/T2}$ is the communications throughput for a wireless network implementing the method of FIG. 4, C is the number of clients transferring data, D is the quantity of data that each client has to transfer, and $T_{T1/T2}$ is the time period required to transmit data in a wireless networking environment switching from one communications channel topology to another communications channel topology according to the method of FIG. 4. Readers will note that the communications throughput achieved in the example according to the method of FIG. 4 is higher than the communications throughput in a wireless networking environment implementing the two communication topologies depicted in FIG. 3 separately. The communications throughput achieved in the example according to the method of FIG. 4 is 22.86 Mbps, while the communications throughput in a topology having three 20 MHz channels is merely 18.00 Mbps and the communications throughput in a topology having one 20 MHz channel and one 40 MHz is merely 8.00 Mbps.

As mentioned above, periodically switching from one communications channel topology to another communications channel topology in dependence upon the supported channel bandwidths of the adapters of the identified clients may be carried out by switching from one communications channel topology that includes one supported channel bandwidth to another communications channel topology that includes another supported channel bandwidth at a time period dependent upon the number of clients having adapters supporting each supported channel bandwidth. For further explanation, therefore, FIG. 5 sets forth a flow chart illustrating a further exemplary method for optimizing communications throughput in a wireless networking environment that supports a plurality of communications channel topologies according to embodiments of the present invention that includes switching (512) from one communications channel topology that includes one supported channel bandwidth to another communications channel topology that includes another supported channel bandwidth at a time period dependent upon the number of clients having adapters supporting each supported channel bandwidth.

The method of FIG. 5 is similar to the method of FIG. 4 for optimizing communications throughput in a wireless networking environment that supports a plurality of communications channel topologies. That is, the method of FIG. 5 is similar to the method of FIG. 4 in that the method of FIG. 5 also includes identifying (300) a plurality of clients having wireless network adapters supporting disparate channel bandwidths in the wireless networking environment, and periodically switching (302) from one communications channel topology to another communications channel topology in dependence upon the supported channel bandwidths of the adapters of the identified clients.

In the method of FIG. 5, periodically switching (302) from one communications channel topology to another communications channel topology in dependence upon the supported channel bandwidths of the adapters of the identified clients includes identifying (410) the supported channel bandwidths. Identifying (410) the supported channel bandwidths may be carried out by traversing through the clients table (400) for unique supported channel bandwidth identifier (406). Identifying (410) the supported channel bandwidths may further be carried out by storing each unique supported channel bandwidth identifier (406) in a supported channel bandwidth table (500). The supported channel bandwidth table (500) associates a supported channel bandwidth identifier (406) with a number of clients (502). The supported channel bandwidth identifier (406) represents the channel bandwidths supported by the adapters of clients in a wireless networking environment. The number of clients (502) represents the number of clients having adapters supporting the channel bandwidths represented by the associated supported channel bandwidth identifier (406).

In the method of FIG. 5, periodically switching (302) from one communications channel topology to another communications channel topology in dependence upon the supported channel bandwidths of the adapters of the identified clients also includes identifying (510) the number of clients having adapters supporting each supported channel bandwidth. Identifying (510) the number of clients having adapters supporting each supported channel bandwidth may be carried out by traversing through the clients table (400) and counting the number of unique client identifiers (402) associated with each unique supported channel bandwidth identifier (406). Identifying (510) the number of clients having adapters supporting each supported channel bandwidth may further be carried out by associating the counted number of client identifiers (402) with each supported channel bandwidth identifier (406) in the supported channel bandwidth table (500).

In the method of FIG. 5, periodically switching (302) from one communications channel topology to another communications channel topology in dependence upon the supported channel bandwidths of the adapters of the identified clients also includes switching (512) from one communications channel topology that includes one supported channel bandwidth to another communications channel topology that includes another supported channel bandwidth at a time period dependent upon the number of clients having adapters supporting each supported channel bandwidth. The time period dependent upon the number of clients having adapters supporting each supported channel bandwidth may be calculated according to a numerical measurements such as, for example, simple ratios, weighted averages, geometric mean, and so on. Consider, for example, a time period calculated according to a simple ratio where ten clients have wireless network adapters supporting a 20 MHz channel bandwidth and one client has a wireless network adapter supporting a 40 MHz channel bandwidth. In such an example, the time period after which the communications channel topology having only a 20 MHz channel bandwidth switches to a communications channel topology having a 40 MHz channel bandwidth may be ten times longer than the time period after which the communications channel topology having a 40 MHz channel bandwidth switches to a communications channel topology having only a 20 MHz channel bandwidth.

In the method of FIG. 5, switching (512) from one communications channel topology that includes one supported channel bandwidth to another communications channel topology that includes another supported channel bandwidth at a time period dependent upon the number of clients having adapters supporting each supported channel bandwidth may be carried out by placing wireless network adapters in an asleep state that are utilizing channels in one topology having one supported channel bandwidth represented in the supported channel bandwidths table (500) after a time period dependent upon the value of the number of clients (502) associated with the supported channel bandwidth identifier (406) representing the channel bandwidth utilized in the communication channel topology. Switching (512) from one communications channel topology that includes one supported channel bandwidth to another communications channel topology that includes another supported channel bandwidth at a time period dependent upon the number of clients having adapters supporting each supported channel bandwidth may further be carried out by placing wireless network adapters in an awake state that are utilizing channels in another topology having another supported channel bandwidth represented in the supported channel bandwidths table (500) after a time period dependent upon the value of the number of clients (502) associated with the supported channel bandwidth identifier (406) representing the channel bandwidth utilized in the communication channel topology. As mentioned above, placing wireless network adapters in an asleep state or an awake state may be carried out as described in the IEEE 802.11 series of wireless network standards.

As mentioned above, periodically switching from one communications channel topology to another communications channel topology in dependence upon the supported channel bandwidths of the adapters of the identified clients may be carried out by switching from one communications channel topology that includes one supported channel bandwidth to another communications channel topology that includes another supported channel bandwidth at a time period dependent upon the quantified data traffic. For further explanation, therefore, FIG. 6 sets forth a flow chart illustrating a further exemplary method for optimizing communications throughput in a wireless networking environment that supports a plurality of communications channel topologies according to embodiments of the present invention that includes switching (612) from one communications channel topology that includes one supported channel bandwidth to another communications channel topology that includes another supported channel bandwidth at a time period dependent upon the quantified current data traffic.

The method of FIG. 6 is similar to the method of FIG. 4 for optimizing communications throughput in a wireless networking environment that supports a plurality of communications channel topologies. That is, the method of FIG. 6 is similar to the method of FIG. 4 in that the method of FIG. 6 also includes identifying (300) a plurality of clients having wireless network adapters supporting disparate channel bandwidths in the wireless networking environment, and periodically switching (302) from one communications channel topology to another communications channel topology in dependence upon the supported channel bandwidths of the adapters of the identified clients.

In the method of FIG. 6, periodically switching (302) from one communications channel topology to another communications channel topology in dependence upon the supported channel bandwidths of the adapters of the identified clients includes identifying (410) the supported channel bandwidths. Identifying (410) the supported channel bandwidths may be carried out by traversing through the clients table (400) for unique supported channel bandwidth identifier (406). Identifying (410) the supported channel bandwidths may further be carried out by storing each unique supported channel bandwidth identifier (406) in a supported channel bandwidth table (600).

In the method of FIG. 6, periodically switching (302) from one communications channel topology to another communications channel topology in dependence upon the supported channel bandwidths of the adapters of the identified clients also includes quantifying (610) current data traffic through each supported channel bandwidth. Quantifying (610) current data traffic through each supported channel bandwidth may be carried out by monitoring the idle time of clients having adapters supporting each channel bandwidth represented by a supported channel bandwidth identifier (406) in table (600). Quantifying (610) current data traffic through each supported channel bandwidth may also be carried out by continuously monitoring or periodically sampling the number of data packets transferred to or from clients having adapters supporting each channel bandwidth represented by a supported channel bandwidth identifier (406) in table (600). Quantifying (610) current data traffic through each supported channel bandwidth may further be carried out by associating the quantified current data traffic (602) with each supported channel bandwidth identifier (406) in the supported channel bandwidth table (600).

The supported channel bandwidth table (600) associates a supported channel bandwidth identifier (406) with a quantified current data traffic (602). The supported channel bandwidth identifier (406) represents the channel bandwidths supported by the adapters of clients in a wireless networking environment. The quantified current data traffic (602) represents the overall quantity of data being transferred at the current time by clients having adapters supporting the channel bandwidths represented by the associated supported channel bandwidth identifier (406).

In the method of FIG. 6, periodically switching (302) from one communications channel topology to another communications channel topology in dependence upon the supported channel bandwidths of the adapters of the identified clients also includes switching (612) from one communications channel topology that includes one supported channel bandwidth to another communications channel topology that includes another supported channel bandwidth at a time period dependent upon the quantified current data traffic. The time period dependent upon the quantified current data traffic may be calculated according to a variety of numerical measurements such as, for example, simple ratios, weighted averages, geometric mean, and so on. Consider, for example, a time period calculated according to a simple ratio where clients having wireless network adapters supporting a 20 MHz channel bandwidth have idle time periods ten times longer than clients having wireless network adapters supporting a 40 MHz channel bandwidth. In such an example, the time period after which the communications channel topology having only a 20 MHz channel bandwidth switches to a communications channel topology having a 40 MHz channel bandwidth may be ten times shorter than the time period after which the communications channel topology having a 40 MHz channel bandwidth switches to a communications channel topology having only a 20 MHz channel bandwidth.

In the method of FIG. 6, switching (612) from one communications channel topology that includes one supported channel bandwidth to another communications channel topology that includes another supported channel bandwidth at a time period dependent upon the quantified current data traffic may be carried out by placing wireless network adapters in an asleep state that are utilizing channels in one topology having one supported channel bandwidth represented in the supported channel bandwidths table (600) after a time period dependent upon the value of the quantified current data traffic (602) associated with the supported channel bandwidth identifier (406) representing the channel bandwidth utilized in the communication channel topology. Switching (612) from one communications channel topology that includes one supported channel bandwidth to another communications channel topology that includes another supported channel bandwidth at a time period dependent upon the quantified current data traffic may be carried out by placing wireless network adapters in an awake state that are utilizing channels in another topology having another supported channel bandwidth represented in the supported channel bandwidths table (600) after a time period dependent upon the value of the quantified current data traffic (602) associated with the supported channel bandwidth identifier (406) representing the channel bandwidth utilized in the communication channel topology. As mentioned above, placing wireless network adapters in an asleep state or an awake state may be carried out as described in the IEEE 802.11 series of wireless network standards.

Although optimizing communications throughput in a wireless networking environment that supports a plurality of communications channel topologies according to the method of FIG. 6 is discussed with reference to current data traffic, the method of FIG. 6 may also be implemented using historic data traffic. In such an exemplary method implemented using historic data traffic, periodically switching from one communications channel topology to another communications channel topology in dependence upon the supported channel bandwidths of the adapters of the identified clients may be carried out by quantifying historic data traffic through each supported channel bandwidth, and switching from one communications channel topology that includes one supported channel bandwidth to another communications channel topology that includes another supported channel bandwidth at a time period dependent upon the quantified historic data traffic in a manner similar to the method of FIG. 6. The time period dependent upon the quantified historic data traffic may be calculated according to a variety of numerical measurements such as, for example, moving averages, regression analysis, time series analysis, and so on.

Readers will recall that optimizing communications throughput in a wireless networking environment that supports a plurality of communications channel topologies according to the method of FIG. 5 advantageously allows for optimizing communications throughput in a wireless networking environment where a large disparity exists in the number of clients having adapters supporting each channel bandwidth. Readers will also recall that optimizing communications throughput in a wireless networking environment that supports a plurality of communications channel topologies according to the method of FIG. 6 advantageously allows for optimizing communications throughput in a wireless networking environment where a large disparity exists in the quantity of data traffic through each supported channel bandwidth. Because the number of clients and the quantities of data being transferred in a wireless network environment is typically dynamic, combining the methods of FIG. 5 and FIG. 6 may advantageously allow for further optimization of communications throughput in a wireless networking environment depending on whether a greater disparity exists between the number of clients having adapters supporting each channel bandwidth or the quantity of data traffic through each supported channel bandwidth. For further explanation, therefore, FIG. 7 sets forth a flow chart illustrating a further exemplary method for optimizing communications throughput in a wireless networking environment that supports a plurality of communications channel topologies according to embodiments of the present invention that is similar to the method of FIGS. 4, 5, and 6.

The method of FIG. 7 is similar to the methods of FIGS. 4, 5, and 6 in that the method of FIG. 7 includes identifying (300) a plurality of clients having wireless network adapters supporting disparate channel bandwidths in the wireless networking environment, periodically switching (302) from one communications channel topology to another communications channel topology in dependence upon the supported channel bandwidths of the adapters of the identified clients, identifying (410) the supported channel bandwidths, identifying (510) the number of clients having adapters supporting each supported channel bandwidth, and quantifying (610) current data traffic through each supported channel bandwidth. Moreover, the example of FIG. 7 includes a supported channel bandwidth table (700) that combines the data elements of the supported channel bandwidth table (500) of FIG. 5 and the supported channel bandwidth table (600) of FIG. 6.

In the method of FIG. 7, periodically switching (302) from one communications channel topology to another communications channel topology in dependence upon the supported channel bandwidths of the adapters of the identified clients includes switching (702) from one communications channel topology that includes one supported channel bandwidth to another communications channel topology that includes another supported channel bandwidth at a time period dependent upon the number of clients having adapters supporting each supported channel bandwidth and the quantified current data traffic. The time period dependent upon the number of clients having adapters supporting each supported channel bandwidth and the quantified current data traffic may be calculated according to numerical measurements such as, for example, simple ratios, weighted averages, geometric mean, and so on, as mentioned above with reference to FIGS. 5 and 6.

In the method of FIG. 7, switching (702) from one communications channel topology that includes one supported channel bandwidth to another communications channel topology that includes another supported channel bandwidth at a time period dependent upon the number of clients having adapters supporting each supported channel bandwidth and the quantified current data traffic may be carried out by placing wireless network adapters in an asleep state that are utilizing channels in one topology having one supported channel bandwidth represented in the supported channel bandwidths table (700) after a time period dependent upon the value of the number of clients (502) and the value of the quantified current data traffic (602) associated with the supported channel bandwidth identifier (406) representing the channel bandwidth utilized in the communication channel topology. In the method of FIG. 7, switching (702) from one communications channel topology that includes one supported channel bandwidth to another communications channel topology that includes another supported channel bandwidth at a time period dependent upon the number of clients having adapters supporting each supported channel bandwidth and the quantified current data traffic may further be carried out by placing wireless network adapters in an awake state that are utilizing channels in another topology having another supported channel bandwidth represented in the supported channel bandwidths table (700) after a time period dependent upon the value of the number of clients (502) and the value of the quantified current data traffic (602) associated with the supported channel bandwidth identifier (406) representing the channel bandwidth utilized in the communication channel topology. As mentioned above, placing wireless network adapters in an asleep state or an awake state may be carried out as described in the IEEE 802.11 series of wireless network standards.

Exemplary embodiments of the present invention are described largely in the context of a fully functional computer system for optimizing communications throughput in a wireless networking environment that supports a plurality of communications channel topologies. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    identifying a plurality of clients having wireless network adapters supporting disparate channel bandwidths in the wireless networking environment; and
    periodically switching from one communications channel topology to another communications channel topology in dependence upon the supported channel bandwidths of the adapters of the identified clients; wherein periodically switching from one communications channel topology to another communications channel topology in dependence upon the supported channel bandwidths of the adapters of the identified clients further comprises identifying the supported channel bandwidths including traversing through a clients table for unique supported channel bandwidth identifier and storing each unique supported channel bandwidth identifier in a supported channel bandwidth list; wherein the supported channel bandwidth list identifies disparate channel bandwidths supported by adapters of clients in the wireless network environment.

2. The method of claim 1 wherein periodically switching from one communications channel topology to another communications channel topology in dependence upon the supported channel bandwidths of the adapters of the identified clients further comprises:
  switching from one communications channel topology that includes one supported channel bandwidth to another communications channel topology that includes another supported channel bandwidth at a predetermined time period.

3. The method of claim 1 wherein periodically switching from one communications channel topology to another communications channel topology in dependence upon the supported channel bandwidths of the adapters of the identified clients further comprises:
  identifying the number of clients having adapters supporting each supported channel bandwidth; and
  switching from one communications channel topology that includes one supported channel bandwidth to another communications channel topology that includes another supported channel bandwidth at a time period dependent upon the number of clients having adapters supporting each supported channel bandwidth.

4. The method of claim 1 wherein periodically switching from one communications channel topology to another communications channel topology in dependence upon the supported channel bandwidths of the adapters of the identified clients further comprises:
  quantifying current data traffic through each supported channel bandwidth; and
  switching from one communications channel topology that includes one supported channel bandwidth to another communications channel topology that includes another supported channel bandwidth at a time period dependent upon the quantified current data traffic.

5. The method of claim 1 wherein periodically switching from one communications channel topology to another communications channel topology in dependence upon the supported channel bandwidths of the adapters of the identified clients further comprises:
  quantifying historic data traffic through each supported channel bandwidth; and
  switching from one communications channel topology that includes one supported channel bandwidth to another communications channel topology that includes another supported channel bandwidth at a time period dependent upon the quantified historic data traffic.

6. The method of claim 1 wherein periodically switching from one communications channel topology to another communications channel topology in dependence upon the supported channel bandwidths of the adapters of the identified clients further comprises:
  identifying the number of clients having adapters supporting each supported channel bandwidth;
  quantifying current data traffic through each supported channel bandwidth; and
  switching from one communications channel topology that includes one supported channel bandwidth to another communications channel topology that includes another supported channel bandwidth at a time period dependent upon the number of clients having adapters supporting each supported channel bandwidth and the quantified current data traffic.

7. An apparatus comprising a computer processor, a computer memory operatively coupled to the computer processor, the computer memory having disposed within it computer program instructions that when executed by the processor cause the apparatus to carry out the steps of:
  identifying a plurality of clients having wireless network adapters supporting disparate channel bandwidths in the wireless networking environment; and
  periodically switching from one communications channel topology to another communications channel topology in dependence upon the supported channel bandwidths of the adapters of the identified clients; wherein periodically switching from one communications channel topology to another communications channel topology in dependence upon the supported channel bandwidths of the adapters of the identified clients further comprises identifying the supported channel bandwidths including traversing through a clients table for unique supported channel bandwidth identifier and storing each unique supported channel bandwidth identifier in a supported channel bandwidth list; wherein the supported channel bandwidth list identifies disparate channel bandwidths supported by adapters of clients in the wireless network environment.

8. The apparatus of claim 7 wherein periodically switching from one communications channel topology to another communications channel topology in dependence upon the supported channel bandwidths of the adapters of the identified clients further comprises:
  switching from one communications channel topology that includes one supported channel bandwidth to another communications channel topology that includes another supported channel bandwidth at a predetermined time period.

9. The apparatus of claim 7 wherein periodically switching from one communications channel topology to another communications channel topology in dependence upon the supported channel bandwidths of the adapters of the identified clients further comprises:
  identifying the number of clients having adapters supporting each supported channel bandwidth; and
  switching from one communications channel topology that includes one supported channel bandwidth to another communications channel topology that includes another supported channel bandwidth at a time period dependent upon the number of clients having adapters supporting each supported channel bandwidth.

10. The apparatus of claim 7 wherein periodically switching from one communications channel topology to another communications channel topology in dependence upon the supported channel bandwidths of the adapters of the identified clients further comprises:
  quantifying current data traffic through each supported channel bandwidth; and
  switching from one communications channel topology that includes one supported channel bandwidth to another communications channel topology that includes another supported channel bandwidth at a time period dependent upon the quantified current data traffic.

11. The apparatus of claim 7 wherein periodically switching from one communications channel topology to another communications channel topology in dependence upon the supported channel bandwidths of the adapters of the identified clients further comprises:
  quantifying historic data traffic through each supported channel bandwidth; and
  switching from one communications channel topology that includes one supported channel bandwidth to another communications channel topology that includes another supported channel bandwidth at a time period dependent upon the quantified historic data traffic.

12. The apparatus of claim 7 wherein periodically switching from one communications channel topology to another communications channel topology in dependence upon the supported channel bandwidths of the adapters of the identified clients further comprises:
  identifying the number of clients having adapters supporting each supported channel bandwidth;
  quantifying current data traffic through each supported channel bandwidth; and
  switching from one communications channel topology that includes one supported channel bandwidth to another communications channel topology that includes another supported channel bandwidth at a time period dependent upon the number of clients having adapters supporting each supported channel bandwidth and the quantified current data traffic.

13. A computer program product disposed upon recordable media for machine-readable information, the computer program product comprising computer program instructions that when executed by a computer cause the computer to carry out the steps of:
  identifying a plurality of clients having wireless network adapters supporting disparate channel bandwidths in the wireless networking environment; and
  periodically switching from one communications channel topology to another communications channel topology in dependence upon the supported channel bandwidths of the adapters of the identified clients; wherein periodically switching from one communications channel topology to another communications channel topology in dependence upon the supported channel bandwidths of the adapters of the identified clients further comprises identifying the supported channel bandwidths including traversing through a clients table for unique supported channel bandwidth identifier and storing each unique supported channel bandwidth identifier in a supported channel bandwidth list; wherein the supported channel bandwidth list identifies disparate channel bandwidths supported by adapters of clients in the wireless network environment.

14. The computer program product of claim 13 wherein periodically switching from one communications channel topology to another communications channel topology in dependence upon the supported channel bandwidths of the adapters of the identified clients further comprises:
  switching from one communications channel topology that includes one supported channel bandwidth to another communications channel topology that includes another supported channel bandwidth at a predetermined time period.

15. The computer program product of claim 13 wherein periodically switching from one communications channel topology to another communications channel topology in dependence upon the supported channel bandwidths of the adapters of the identified clients further comprises:
  identifying the number of clients having adapters supporting each supported channel bandwidth; and
  switching from one communications channel topology that includes one supported channel bandwidth to another communications channel topology that includes another supported channel bandwidth at a time period dependent upon the number of clients having adapters supporting each supported channel bandwidth.

16. The computer program product of claim 13 wherein periodically switching from one communications channel topology to another communications channel topology in dependence upon the supported channel bandwidths of the adapters of the identified clients further comprises:
  quantifying current data traffic through each supported channel bandwidth; and
  switching from one communications channel topology that includes one supported channel bandwidth to another communications channel topology that includes another supported channel bandwidth at a time period dependent upon the quantified current data traffic.

17. The computer program product of claim 13 wherein periodically switching from one communications channel topology to another communications channel topology in dependence upon the supported channel bandwidths of the adapters of the identified clients further comprises:
  quantifying historic data traffic through each supported channel bandwidth; and
  switching from one communications channel topology that includes one supported channel bandwidth to another communications channel topology that includes another supported channel bandwidth at a time period dependent upon the quantified historic data traffic.

18. The computer program product of claim 13 wherein periodically switching from one communications channel topology to another communications channel topology in dependence upon the supported channel bandwidths of the adapters of the identified clients further comprises:
  identifying the number of clients having adapters supporting each supported channel bandwidth;
  quantifying current data traffic through each supported channel bandwidth; and
  switching from one communications channel topology that includes one supported channel bandwidth to another communications channel topology that includes another supported channel bandwidth at a time period dependent upon the number of clients having adapters supporting each supported channel bandwidth and the quantified current data traffic.

* * * * *